(12) United States Patent
Chen et al.

(10) Patent No.: US 9,353,926 B2
(45) Date of Patent: May 31, 2016

(54) OPTICAL FILM

(71) Applicant: Beautylight Optronics Co., Ltd, HsinChu (TW)

(72) Inventors: Shu-Wei Chen, Taoyuan County (TW); Liang-Shiun Chen, Taichung (TW); Shi-Hao Liu, Hsinchu (TW)

(73) Assignee: Beautylight Optronics Co., Ltd., HsinChu (TW)

( * ) Notice: Subject to any disclaimer, the term of this patent is extended or adjusted under 35 U.S.C. 154(b) by 96 days.

(21) Appl. No.: 14/527,781

(22) Filed: Oct. 30, 2014

(65) Prior Publication Data

US 2015/0300593 A1   Oct. 22, 2015

(30) Foreign Application Priority Data

Apr. 22, 2014   (TW) .............................. 103114509 A (51) Int. Cl.
| | |
|---|---|
| *F21V 5/00* | (2015.01) |
| *F21V 5/02* | (2006.01) |
| *G02B 19/00* | (2006.01) |
| *G09F 13/00* | (2006.01) |

(52) U.S. Cl.
CPC . *F21V 5/02* (2013.01); *G02B 19/00* (2013.01); *G09F 13/00* (2013.01)

(58) Field of Classification Search
CPC ............. F21V 5/00; F21V 5/02; G02B 19/00; G02B 26/00; G02B 27/00; G09F 13/00
USPC ................................................. 362/331, 332
See application file for complete search history.

(56) References Cited

U.S. PATENT DOCUMENTS

| | | | |
|---|---|---|---|
| 8,460,585 B2 | 6/2013 | Chao et al. | |
| 8,545,062 B2 | 10/2013 | Lin et al. | |
| 2006/0250707 A1* | 11/2006 | Whitney ................ | G02B 5/045 359/831 |
| 2006/0256582 A1* | 11/2006 | Chuang ................. | G02B 5/045 362/620 |
| 2008/0037947 A1* | 2/2008 | Chao .................... | G02B 3/0025 385/146 |

FOREIGN PATENT DOCUMENTS

TW    M314349    6/2007

* cited by examiner

*Primary Examiner* — Ali Alavi
(74) *Attorney, Agent, or Firm* — Jianq Chyun IP Office (57) ABSTRACT

An optical film includes a substrate, a plurality of first prism structures, and a plurality of second prism structures. The substrate includes a first surface and a second surface opposite thereto. The first prism structures are disposed on the first surface. Each of the first prism structures has plurality sets of first optical surfaces. The first optical surfaces belonging to the same set have the same absolute value of slope, and the first optical surfaces belonging to different sets have different absolute values of slopes, respectively. The second prism structures are disposed on the second surface. Each of the second prism structures has plurality sets of second optical surfaces. The second optical surfaces belonging to the same set have the same absolute value of slope, and the second optical surfaces belonging to different sets have different absolute values of slopes, respectively.

20 Claims, 6 Drawing Sheets

OPTICAL FILM

CROSS-REFERENCE TO RELATED APPLICATION

This application claims the priority benefit of Taiwan application serial no. 103114509, filed on Apr. 22, 2014. The entirety of the above-mentioned patent application is hereby incorporated by reference herein and made a part of this specification.

FIELD OF THE INVENTION

The invention relates to an optical film. More particularly, the invention relates to an optical film for incident light to be emitted uniformly.

DESCRIPTION OF RELATED ART

Generally, optical films are usually applied on planar light sources. Currently, common planar light sources in the market are mostly applied on illumination appliances (i.e., indoor illumination, outdoor illumination, medical illumination, illumination for displays in airports) or backlight modules of liquid crystal display (LCD). Conventional optical films are stacked so as to enhance brightness of planar light sources. However, when optical films are disposed in a stacking manner, an issue of uneven distributed lights emitted from the optical films may occur easily, and thereby causing deteriorated optical quality. Therefore, how to ensure light distribution uniformity and brightness of planar light sources has become an important topics to be solved.

SUMMARY OF THE INVENTION

The invention provides an optical film with favorable optical characteristics.

In an embodiment of the invention, an optical film includes a substrate, a plurality of first prism structures, and a plurality of second prism structures. The substrate has a first surface and a second surface opposite to the first surface. The first prism structures are disposed on the first surface. Each of the first prism structures has plurality sets of first optical surfaces. The first optical surfaces belonging to the same set have the same absolute value of slope, and the first optical surfaces belonging to different sets have different absolute values of slopes, respectively. The second prism structures are disposed on the second surface. Each of the second prism structures has plurality sets of second optical surfaces. The second optical surfaces belonging to the same set have the same absolute value of slope, and the second optical surfaces belonging to different sets have different absolute values of slopes, respectively.

In an embodiment of the invention, the first prism structures comprise a plurality of first strip prisms parallel to each other.

In an embodiment of the invention, each of the first prism structures respectively has a first bottom surface connected to the substrate. As a shortest distance between each of the first optical surfaces and the first bottom surface is greater, an acute angle formed between each set of the first optical surfaces and the first bottom surface is smaller.

In an embodiment illustrating the optical film of the invention, as a shortest distance between the each of the first optical surfaces and the first bottom surface is greater, an absolute value of slope of each set of the first optical surfaces is smaller.

In an embodiment of the invention, a top section of each of the first prism structures has a first crest line, and an extending direction of each of the first crest lines is parallel to an extending direction of each of the first prism structures.

In an embodiment of the invention, the second prism structures are a plurality of second strip prisms parallel to each other.

In an embodiment of the invention, an extending direction of the first strip prism and an extending direction of the second strip prism form an included angle, and the included angle is from 60 degrees to 210 degrees.

In an embodiment of the invention, each of the second prism structures respectively has a second bottom surface connected to the substrate. As a shortest distance between each of the second optical surfaces and the second bottom surface is greater, an acute angle formed between each set of the second optical surfaces and the second bottom surface is smaller.

In an embodiment illustrating the optical film of the invention, as a shortest distance between each of the second optical surfaces and the second bottom surface is greater, an absolute value of slope of each set of the second optical surfaces is smaller.

In an embodiment of the invention, a top section of each of the second prism structures has a second crest line, and an extending direction of each of the second crest lines is parallel to an extending direction of each of the second prism structures.

In an embodiment of the invention, the first prism structures are a plurality of first island prisms arranged in array along a first axial direction and a second axial direction.

In an embodiment of the invention, an included angle between the first axial direction and the second axial direction is from 45 degrees to 135 degrees.

In an embodiment of the invention, each of the first prism structures respectively has a first bottom surface connected to the substrate. As a shortest distance between each of the first optical surfaces and the first bottom surface is greater, an acute angle formed between each set of the first optical surfaces and the first bottom surface is smaller.

In an embodiment illustrating the optical film of the invention, as a shortest distance between each of the first optical surfaces and the first bottom surface is greater, an absolute value of slope of each set of the first optical surfaces is smaller.

In an embodiment of the invention, a top section of each of the first prism structures has a first vertex.

In an embodiment of the invention, a plurality of the second prism structures are a plurality of second island prisms arranged in array along a third axial direction and a fourth axial direction.

In an embodiment of the invention, an included angle between the third axial direction and the fourth axial direction is from 45 degrees to 135 degrees, and the first axial direction, the second axial direction, the third axial direction and the fourth axial direction do not overlap with each other.

In an embodiment of the invention, each of the second prism structures respectively has a second bottom surface connected to the substrate. As a shortest distance between each of the second optical surfaces and the second bottom surface is greater, an acute angle formed between each set of the second optical surfaces and the second bottom surface is smaller.

In an embodiment illustrating the optical film of the invention, as a shortest distance between each of the second optical surfaces and the second bottom surface is greater, an absolute value of slope of each set of the second optical surfaces is smaller.

In an embodiment of the invention, a top section of each of the second prism structures has a second vertex.

In view of the above, the optical film of the above embodiments of the invention allows lights to be distributed uniformly, and brightness thereof can be enhanced effectively.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
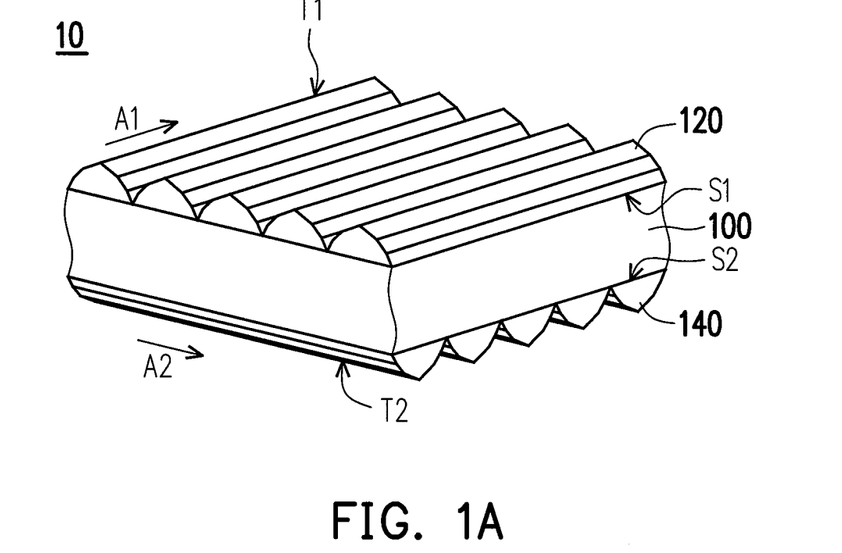
FIG. 1A is a perspective view illustrating an optical film according to a first embodiment of the invention.
Figure 1B:
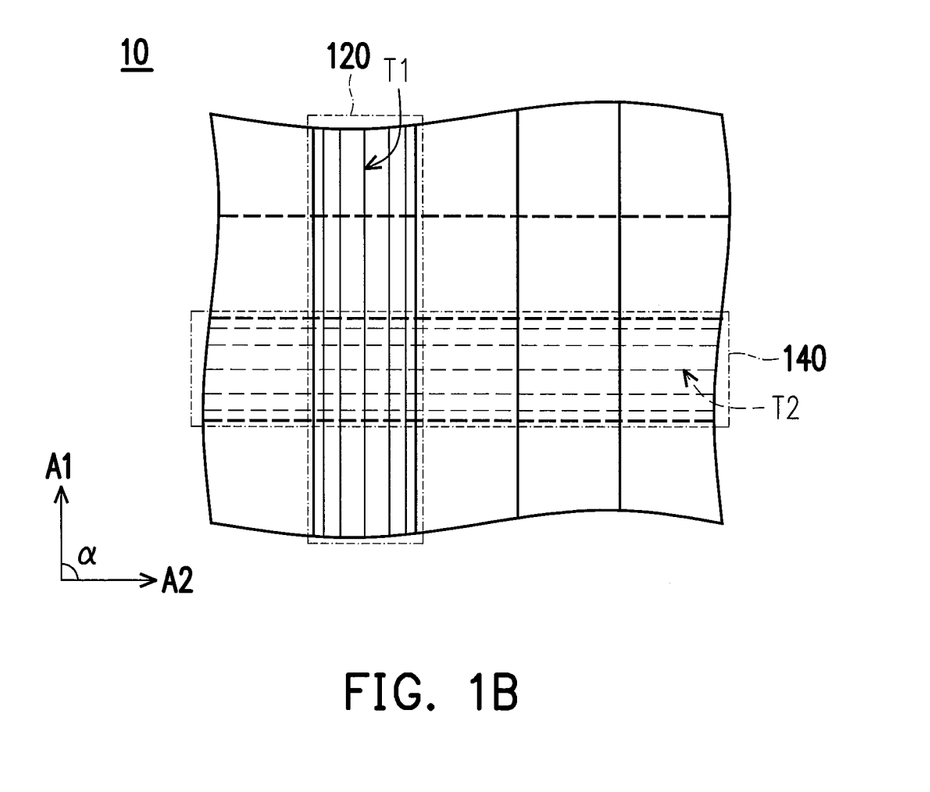
FIG. 1B is a top view illustrating the optical film of FIG. 1A.

FIG. 1A is a perspective view illustrating an optical film according to a first embodiment of the invention. FIG. 1B is a top view illustrating the optical film of FIG. 1A (only one of periodical structures is illustrated for representation). With reference to FIG. 1A and FIG. 1B, an optical film 10 of the present embodiment includes a substrate 100, a plurality of first prism structures 120, and a plurality of second prism structures 140. The substrate 100 has a first surface S1 and a second surface S2 opposite to the first surface S1, wherein the first prism structures 120 are arranged on the first surface S1, and the second prism structures 140 are arranged on the second surface S2.

Figure 2A:
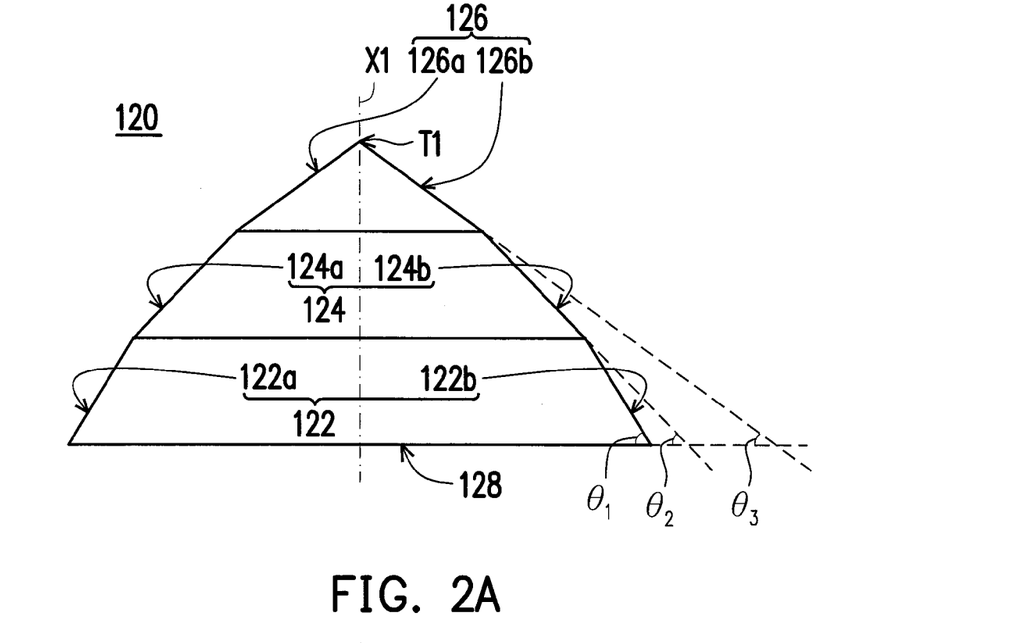
FIG. 2A is a partial cross-sectional view illustrating a first prism structure of the optical film of FIG. 1A.
Figure 2B:
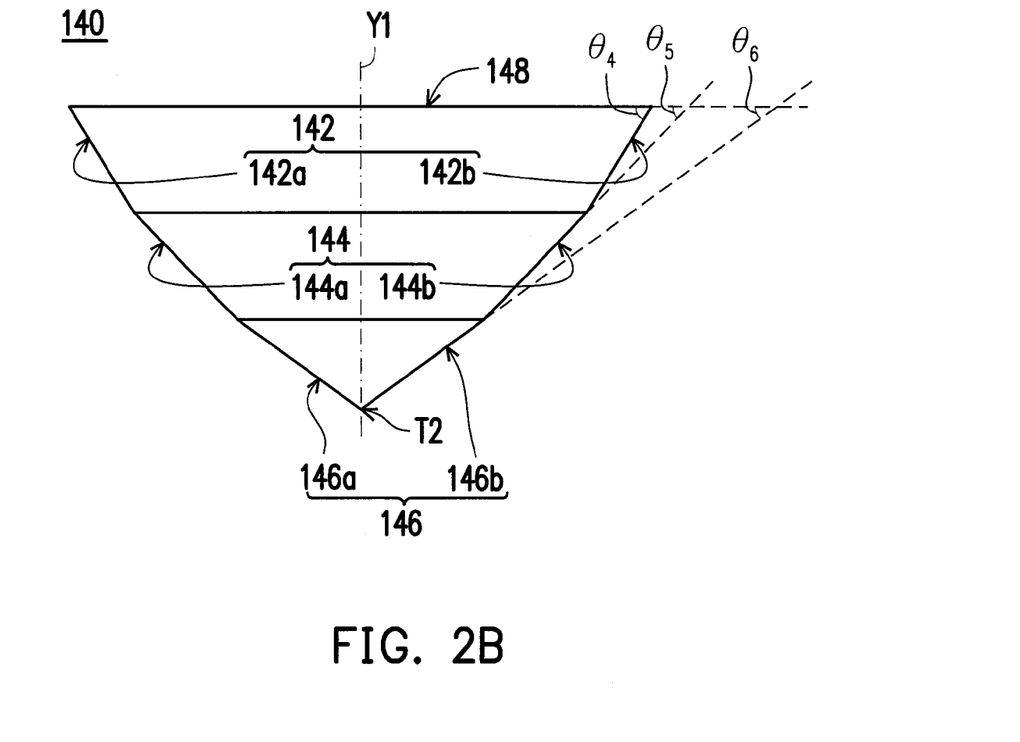
FIG. 2B is a partial cross-sectional view illustrating a second prism structure of the optical film of FIG. 1A.

FIG. 2A is a partial cross-sectional view illustrating the first prism structure of the optical film of FIG. 1A, while FIG. 2B is a partial cross-sectional view illustrating the second prism structure of the optical film of FIG. 1A. With reference to FIG. 2A and FIG. 2B, in the present embodiment, each of the first prism structures 120 has plurality sets of first optical surfaces 122, 124, and 126. Each of the second prism structures 140 has plurality sets of second optical surfaces 142, 144, and 146.

The first prism structure 120 of the present embodiment is illustrated by taking three sets of the first optical surfaces 122, 124, and 126 as examples. Of course, the invention is not limited thereto. In other words, numbers of sets of the first optical surfaces may be two sets, four sets, more than four sets or other possible numbers of sets. For convenience, the first optical surfaces are exemplified in three sets hereinafter. Likewise, the second prism structure 140 of the present embodiment is illustrated by taking three sets of the second optical surfaces 142, 144, and 146 as examples. Of course, the invention is not limited thereto. In other words, numbers of sets of the second optical surfaces may be two sets, four sets, more than four sets or other possible numbers of sets. For convenience, the second optical surfaces is exemplified in three sets hereinafter.

First, with reference to FIG. 2A, numbers of a first set of the first optical surfaces 122 are two. In other words, the first set of the first optical surfaces 122 includes a first optical surface 122a and a first optical surface 122b. Numbers of a second set of the first optical surfaces 124 are two. In other words, the second set of the first optical surfaces 124 includes a first optical surface 124a and a first optical surface 124b. Numbers of a third set of the first optical surfaces 126 are two. In other words, the third set of the first optical surface 126 includes a first optical surfaces 126a and a first optical surfaces 126b. The first optical surface 122a and the first optical surface 122b has the same absolute value of slope. The first optical surface 124a and the first optical surface 124b have the same absolute value of slope. The first optical surfaces 126a and the first optical surfaces 126b have the same absolute value of slope. However, the absolute values of slopes of the first optical surface 122a, the first optical surface 124a, and the first optical surface 126a are not the same.

For example, when slopes of the first optical surface 122a, the first optical surface 124a, and the first optical surface 126a are positive values, slopes of the first optical surface 122b, the first optical surface 124b, and the first optical surface 126b are negative values. In addition, the absolute value of slope of the first optical surface 122a and the first optical surface 122b is, for example, from 1.2 to 1.8. The absolute value of slope of the first optical surface 124a and the first optical surface 124b is, for example, from 0.8 to 1.2. The absolute value of slope of the first optical surface 126a and the first optical surface 126b is, for example, from 0.3 to 0.8.

Please refer to FIG. 1A and FIG. 2A together. More specifically, when the first optical surface 122a and the first optical surface 122b have the same vertical height, the first optical surface 124a and the first optical surface 124b have the same vertical height, and the first optical surface 126a and the first optical surface 126b have the same vertical height, a cross section of a profile of the first prism structure 120 perpendicular to an extending direction A1 is a symmetrical polygon. Specifically, the cross section is symmetrical to a plane X1 and the plane X1 is perpendicular to a first bottom surface 128. The plane X1 pass through a first crest line T1 of a top section of the first prism structure 120, and the extending direction A1 of each of the first crest lines T1 is parallel to an extending direction of each of the first prism structures 120.

In the present embodiment, the first prism structures 120 are a plurality of first strip prisms parallel to each other. Each of the first prism structures 120 respectively has a first bottom surface 128 connected to the substrate 100. As a shortest distance between each of the first optical surfaces 122, 124, 126 and the first bottom surface 128 is greater, an acute angle formed between the each of the first optical surfaces 122, 124, 126 and the first bottom surface 128 is respectively θ1, θ2, and θ3, wherein the acute angle θ1>the acute angle θ2>the acute angle θ3. Besides, as a shortest distance between each of the first optical surfaces 122, 124, 126 and the first bottom surface 128 is greater, an absolute value of slope of the each of the first optical surfaces 122, 124, 126 is respectively R1, R2, and R3, wherein the absolute value of slope R1>the absolute value of slope R2>the absolute value of slope R3.

On another aspect, with reference to FIG. 2B, numbers of a first set of the second optical surfaces 142 are two. In other words, the first set of the second optical surfaces 142 includes a second optical surface 142a and a second optical surface 142b. Numbers of a second set of the second optical surfaces 144 are two. In other words, the second set of the second optical surfaces 144 includes a second optical surface 144a and a second optical surface 144b. Numbers of a third set of the second optical surfaces 146 are two. In other words, the third set of the second optical surface 146 includes a second optical surfaces 146a and a second optical surfaces 146b. The second optical surface 142a and the second optical surface 142b have the same absolute value of slope. The second optical surface 144a and the second optical surface 144b have the same absolute value of slope. The second optical surfaces 146a and the second optical surfaces 146b have the same absolute value of slope. However, the absolute values of slopes of the second optical surface 142a, the second optical surface 144a, and the second optical surface 146a are not the same.

For example, when slopes of the second optical surface 142a, the second optical surface 144a, and the second optical surface 146a are negative values, slopes of the second optical surface 142b, the second optical surface 144b, and the second optical surface 146b are positive values. In addition, the absolute value of slope of the second optical surface 142a and the second optical surface 142b is, for example, from 1.2 to 1.8. The absolute value of slope of the second optical surface 144a and the second optical surface 144b is, for example, from 0.8 to 1.2. The absolute value of slope of the second optical surface 146a and the second optical surface 146b is, for example, from 0.3 to 0.8.

Please refer to FIG. 1A and FIG. 2B together. More particularly, when the second optical surface 142a and the second optical surface 142b have the same vertical height, the second optical surface 144a and the second optical surface 144b have the same vertical height, and the second optical surface 146a and the second optical surface 146b have the same vertical height, a cross section of a profile of each of the second prism structures 140 perpendicular to an extending direction A2 is a symmetrical polygon. Specifically, the cross section is symmetrical to a plane Y1 and the plane Y1 is perpendicular to a second bottom surface 148, and the plane Y1 passes through a second crest line T2 of a top section of the second prism structure 140. The top section of each of the second prism structures 140 has the second crest line T2, and the extending direction T2 of the each of the second crest lines T2 is parallel to the extending direction A2 of the each of the second prism structures 140.

In the present embodiment, the second prism structures 140 are a plurality of second strip prisms parallel to each other. The each of the second prism structures 140 respectively has a second bottom surface 148 connected to the substrate 100. As a shortest distance between each of the second optical surfaces 142, 144, 146 and the second bottom surface 148 is greater, an acute angle formed between the each of the second optical surfaces 142, 144, 146 and the second bottom surface 148 is respectively θ4, θ5, and θ6, wherein the acute angle θ4>the acute angle θ5>the acute angle θ6. Besides, as a shortest distance between the each of the second optical surfaces 142, 144, 146 and the second bottom surface 148 is greater, an absolute value of slope of the each of the second optical surfaces 142, 144, 146 is respectively R4, R5, and R6, wherein the absolute value of slope R4>the absolute value of slope R5>the absolute value of slope R6.

In addition to the above, please refer to FIG. 1A and FIG. 1B. In the present embodiment, the extending direction A1 of the first strip prism and the extending direction A2 of the second strip prism form an included angle α. Preferably, the first prism structure 120 and the second prism structure 140 of the optical film 10 have the same profile, and the included angle α is from 60 degrees to 120 degrees. It should be noted that if the first prism structure 120 and the second prism structure 140 do not have the same profile, then effects of light uniformity along the extending direction A1 and effects of light uniformity along the extending direction A2 are different. Alternatively, if the included angle is not from 60 degrees to 120 degrees, then effects of light uniformity is only similar to the effects of light uniformity of the first prism structure 120, or is only the effects of light uniformity of the second prism structure 140.

In the present embodiment, the optical film 10, on the opposite surfaces of the same substrate, has respectively a plurality of strip-shaped prism structures parallel to each other. These strip-shaped prism structures have the same profile but extend toward different directions, and an included angle between different extending directions is from 60 degrees to 120 degrees. Furthermore, a profile of each of the prism structures is a polygonal structure arranged symmetrically in a single axial. Moreover, as a shortest distance between an acute angle and a bottom surface is greater, the acute angle formed between each of optical surfaces of the prism structures and the bottom surface is smaller. As a shortest distance between an absolute value of slope and the bottom surface is greater, the absolute value of slope of each of the optical surfaces of the prism structures is smaller. The optical film by the present embodiment allows lights to be distributed uniformly, and brightness thereof can be enhanced effectively.

Figure 3A:
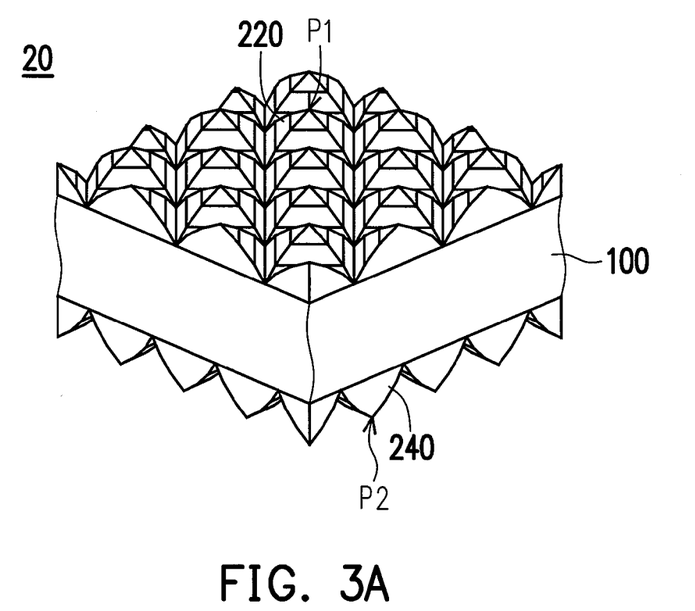
FIG. 3A is a schematic perspective view illustrating an optical film according to a second embodiment of the invention.
Figure 3B:
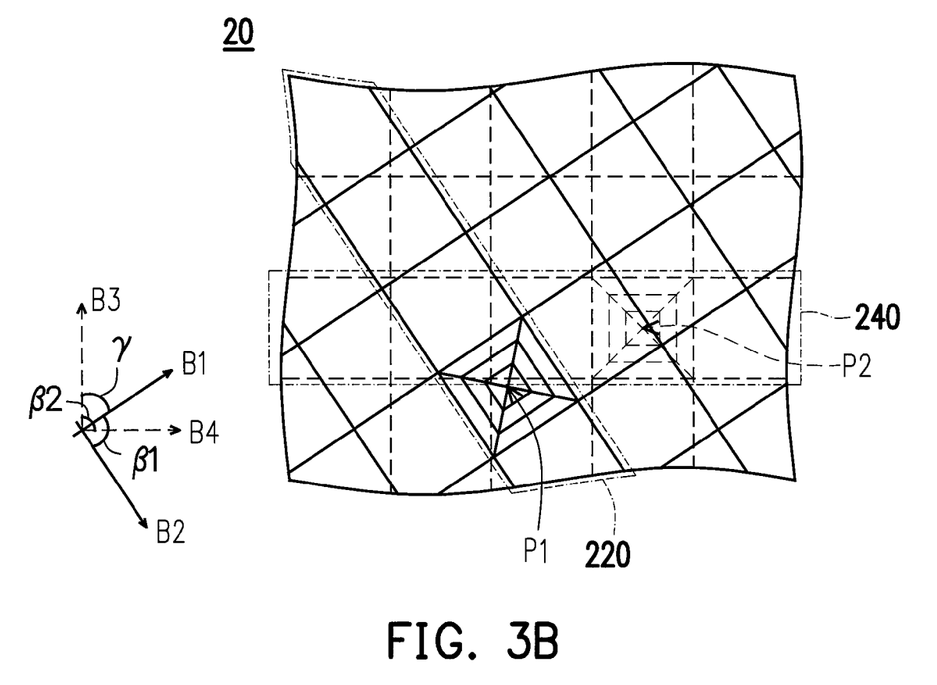
FIG. 3B is a top view illustrating the optical film of FIG. 3A.

FIG. 3A is a schematic perspective view illustrating the optical film according to a second embodiment of the invention. FIG. 3B is a top view illustrating the optical film of FIG. 3A (only one of periodical structures is illustrated for representation). Referring to FIGS. 3A and 3B together, in the present embodiment, an optical film 20 is similar to the optical film 10. Accordingly, the similar elements are indicated by the same reference numbers and have similar functions. Thus, descriptions thereof are omitted herein. A primary difference between the optical film 20 and the optical film 10 lies in that first prism structures 220 are first island prisms arranged in an array along a first axial direction B1 and a second axial direction B2, and a top section thereof has a first vertex P1. In addition, second prism structures 240 are second island prisms arranged in an array along a third axial direction B3 and a fourth axial direction B4, and a top section thereof has a second vertex P2.

Figure 4A:
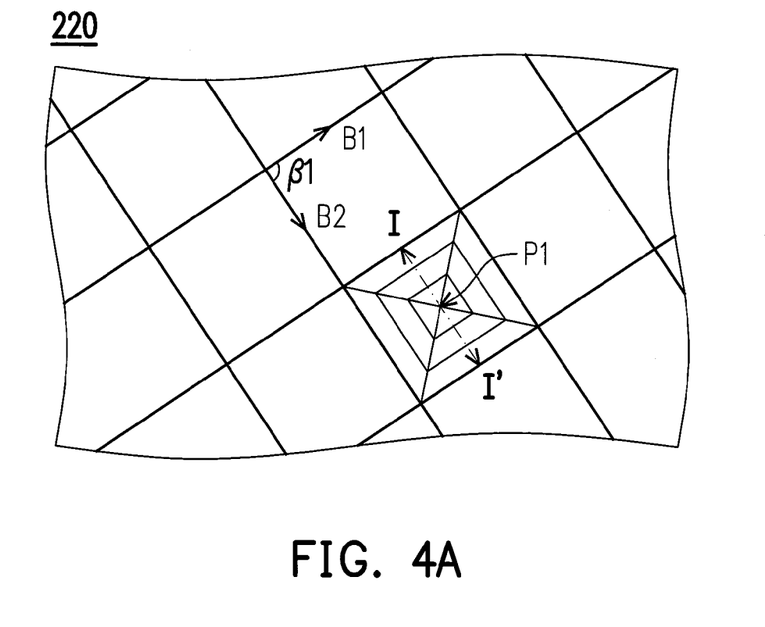
FIG. 4A is a top view illustrating a plurality of first prism structures of the optical film of FIG. 3A.
Figure 4B:
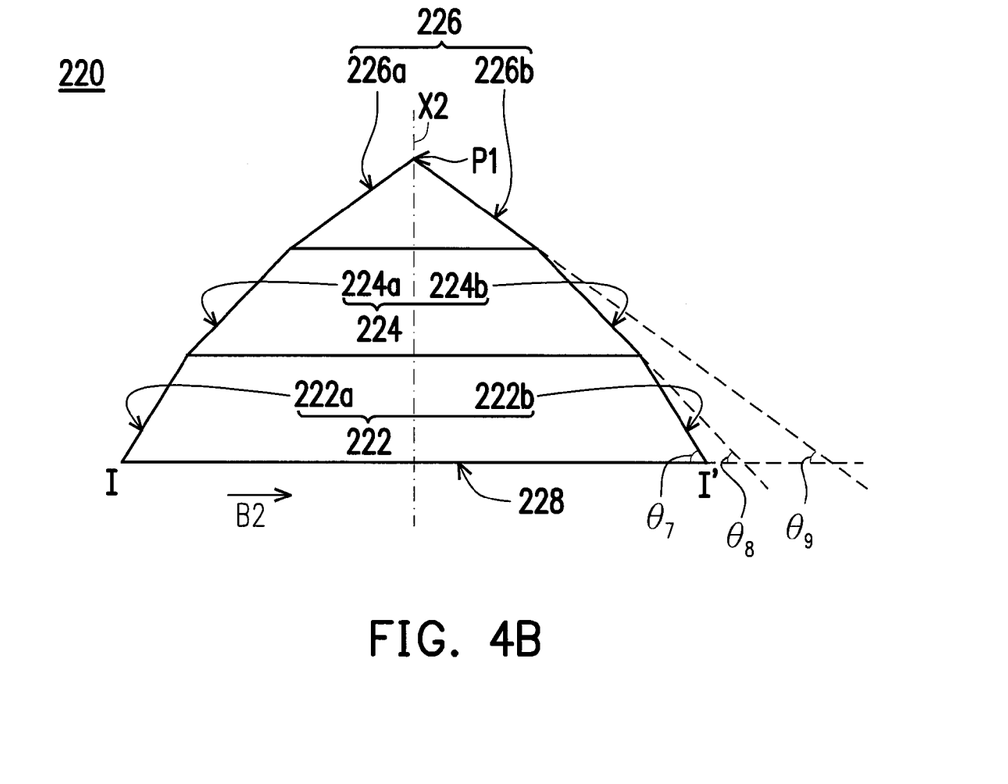
FIG. 4B is a partial cross-sectional view illustrating the first prism structure of the optical film along line I-I' of FIG. 4A.

FIG. 4A is a top view illustrating the first prism structures of the optical film of FIG. 3A (only one of the first prism structures is illustrated for details). FIG. 4B is a partial cross-sectional view illustrating the first prism structure of the optical film along line I-I' of FIG. 4A. With reference to FIG. 4A and FIG. 4B, in the present embodiment, the top view of the first prism structure 220 shows a plurality of parallelograms having the same center point and similar shapes, wherein two adjacent sides of the parallelograms extend respectively along the first axial direction B1 and the second axial direction B2. In addition, the line I-I' passes the first vertex P1 and extends along the second axial direction B2. Besides, as shown in FIG. 4B, each of the first prism structures 220 has plurality sets of first optical surfaces 222, 224, and 226.

The first prism structure 220 of the present embodiment is illustrated by taking three sets of the first optical surfaces 222, 224, and 226 as examples. Of course, the invention is not limited thereto. In other words, numbers of sets of the first optical surfaces may be two sets, four sets, more than four sets or other possible numbers of sets. For convenience, the first optical surface is exemplified in three sets hereinafter.

With reference to FIG. 4B, numbers of a first set of the first optical surfaces 222 are two. In other words, the first set of the first optical surfaces 222 includes a first optical surface 222a and a first optical surface 222b. Numbers of a second set of the first optical surfaces 224 are two. In other words, the second set of the first optical surfaces 224 includes a first optical surface 224a and a first optical surface 224b. Numbers of a third set of the first optical surfaces 226 are two. In other words, the third set of the first optical surfaces 226 includes a first optical surface 226a and a first optical surface 226b. The first optical surface 222a and the first optical surface 222b have the same absolute value of slope. The first optical surface 224a and the first optical surface 224b have the same absolute value of slope. The first optical surfaces 226a and the first optical surfaces 226b have the same absolute value of slope. However, the absolute values of slopes of the first optical surface 222a, the first optical surface 224a, and the first optical surface 226a are not the same.

For example, when slopes of the first optical surface 222a, the first optical surface 224a, and the first optical surface 226a are positive values, slopes of the first optical surface 222b, the first optical surface 224b, and the first optical surface 226b are negative values. In addition, the absolute value of slope of the first optical surface 222a and the first optical surface 222b is, for example, from 1.2 to 1.8. The absolute value of slope of the first optical surface 224a and the first optical surface 224b is, for example, from 0.8 to 1.2. The absolute value of slope of the first optical surface 226a and the first optical surface 226b is, for example, from 0.3 to 0.8.

Please refer to FIG. 3A and FIG. 4B together. More particularly, when the first optical surface 222a and the first optical surface 222b have the same vertical height, the first optical surface 224a and the first optical surface 224b have the same vertical height, and the first optical surface 226a and the first optical surface 226b have the same vertical height, a cross section of a profile of the first prism structure 220 along the second axial direction B2 is a symmetrical polygon. Specifically, the cross section is symmetrical to a plane X2 and the plane X2 is perpendicular to a first bottom surface 228, and the plane X2 passes through a first vertex P1 of the first prism structure 220.

On another aspect, a profile of the first prism structure 220 passing the first vertex P1 and extending along the first axial direction B1 is similar to the profile as shown in FIG. 4B. Thus, repetitive descriptions are omitted and not reiterated herein.

In the present embodiment, the first prism structures 220 are a plurality of first strip prisms arranged in array along the first axial direction B1 and the second axial direction B2. Each of the first prism structures 220 respectively has the first bottom surface 228 connected to the substrate 100. As a shortest distance between each of the first optical surfaces 222, 224, 226 and the first bottom surface 228 is greater, an acute angle formed between the each of the first optical surfaces 222, 224, 226 and the first bottom surface 228 is respectively θ7, θ8, and θ9, wherein the acute angle θ7>the acute angle θ8>the acute angle θ9. Besides, as a shortest distance between each of the first optical surfaces 222, 224, 226 and the first bottom surface 228 is greater, an absolute value of slope of the each of the first optical surfaces 222, 224, 226 is respectively R7, R8, and R9, wherein the absolute value of slope R7>the absolute value of slope R8>the absolute value of slope R9.

Figure 4C:
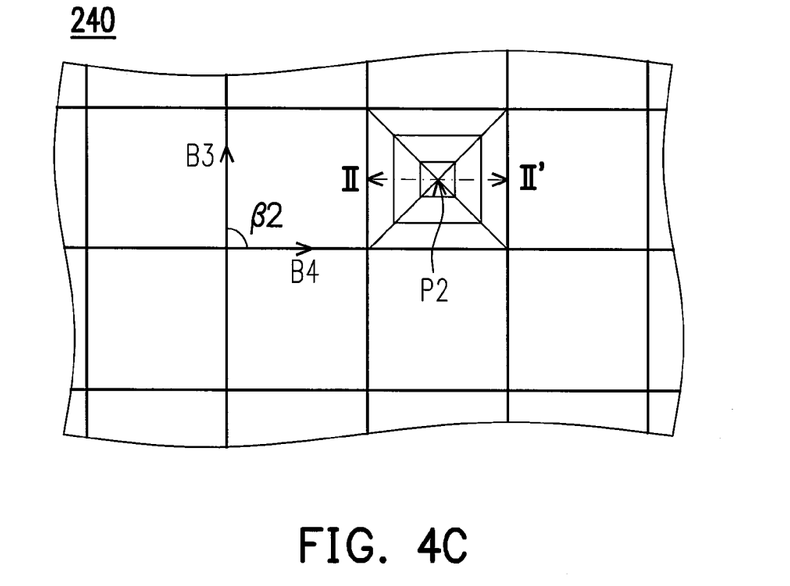
FIG. 4C is a top view illustrating a plurality of second prism structures of the optical film of FIG. 3A.
Figure 4D:
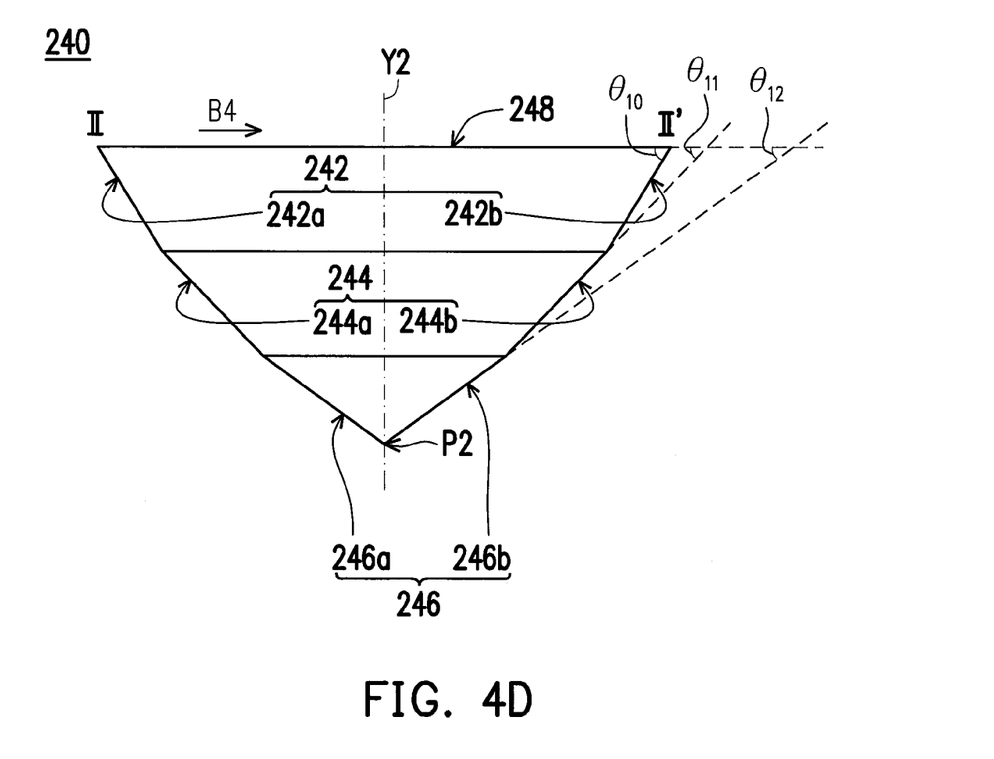
FIG. 4D is a partial cross-sectional view illustrating the second prism structure of the optical film along line II-II' of FIG. 4C.

Likewise, please refer to FIG. 4C and FIG. 4D. FIG. 4A is a top view illustrating the second prism structures of the optical film of FIG. 3A (only one of the second prism structures is illustrated for details). FIG. 4D is a partial cross-sectional view illustrating the second prism structure of the optical film along line II-II' of FIG. 4C. With reference to FIG. 4C and FIG. 4D, in the present embodiment, the top view of the second prism structure 240 shows a plurality of parallelograms having the same center point and similar shapes, wherein two adjacent sides of the parallelograms extend respectively along the third axial direction B3 and the fourth axial direction B4. In addition, the line II-II' passes the second vertex P2 and extends along the fourth axial direction B4. Besides, as shown in FIG. 4D, each of the second prism structures 240 has plurality sets of first optical surfaces 242, 244, and 246.

The second prism structure 240 of the present embodiment is illustrated by taking three sets of the second optical surfaces 242, 244, and 246 as examples. Of course, the invention is not limited thereto. In other words, numbers of sets of the second optical surfaces may be two sets, four sets, more than four sets or other possible numbers of sets. For convenience, the second optical surface is exemplified in three sets hereinafter.

With reference to FIG. 4D, numbers of a first set of the second optical surfaces 242 are two. In other words, the first set of the second optical surfaces 242 includes a second optical surface 242a and a second optical surface 242b. Numbers of a second set of the second optical surfaces 244 are two. In other words, the second set of the second optical surfaces 244 includes a second optical surface 244a and a second optical surface 244b. Numbers of a third set of the second optical surfaces 246 are two. In other words, the third set of the second optical surface 246 includes a second optical surfaces 246a and a second optical surfaces 246b. The second optical surface 242a and the second optical surface 242b have the same absolute value of slope. The second optical surface 244a and the second optical surface 244b have the same absolute value of slope. The second optical surface 246a and the second optical surface 246b have the same absolute value of slope. However, the absolute values of slopes of the second optical surface 242a, the second optical surface 244a, and the second optical surface 246a are not the same.

For example, when slopes of the second optical surface 242a, the second optical surface 244a, and the second optical surface 246a are negative values, slopes of the second optical surface 242b, the second optical surface 244b, and the second optical surface 246b are positive values. In addition, the absolute value of slope of the second optical surface 242a and the second optical surface 242b is, for example, from 1.2 to 1.8. The absolute value of slope of the second optical surface 244a and the second optical surface 244b is, for example, from 0.8 to 1.2. The absolute value of slope of the second optical surface 246a and the second optical surface 246b is, for example, from 0.3 to 0.8.

Please refer to FIG. 3A and FIG. 4D together. More particularly, when the second optical surface 242a and the second optical surface 242b have the same vertical height, the second optical surface 244a and the second optical surface 244b have the same vertical height, and the second optical surface 246a and the second optical surface 246b have the same vertical height, a cross section of a profile of the second prism structure 240 along the fourth axial direction B4 is a symmetrical polygon. Specifically, the cross section is symmetrical to a plane Y2 and the plane Y2 is perpendicular to a second bottom surface 248, and the plane Y2 passes through a second vertex P2 of the second prism structure 240.

On another aspect, a profile of the second prism structure 240 passing the second vertex P2 and extending along the third axial direction B3 is similar to the profile as shown in FIG. 4D. Thus, repetitive descriptions are omitted and not reiterated herein.

In the present embodiment, the second prism structures 240 are a plurality of second strip prisms arranged in array along the third axial direction B3 and the fourth axial direction B4. The each of the second prism structures 240 respectively has a second bottom surface 248 connected to the substrate 100. As a shortest distance between each of the second optical surfaces 242, 244, 246 and the second bottom surface 248 is greater, an acute angle formed between the each of the second optical surfaces 242, 244, 246 and the second bottom surface 248 is respectively θ10, θ11, and θ12, wherein the acute angle θ10>the acute angle θ11>the acute angle θ12. Besides, as a shortest distance between the each of the second optical surfaces 242, 244, 246 and the second bottom surface 248 is greater, an absolute value of slope of the each of the second optical surfaces 242, 244, 246 is respectively R10, R11, and R12, wherein the absolute value of slope R10>the absolute value of slope R11>the absolute value of slope R12.

In addition to the above, please refer to FIG. 3A and FIG. 3B. In the present embodiment, the first axial direction B1 and the second axial direction B2 of the first prism structure 220 form an included angle β1. Preferably, the included angle β1 of the first axial direction B1 and the second axial direction B2 is from 45 degrees to 135 degrees. Furthermore, the third axial direction B3 and the fourth axial direction B4 of the second prism structure 240 form an included angle β2. Preferably, the included angle β2 of the third axial direction B3 and the fourth axial direction B4 is from 45 degrees to 135 degrees. In the present embodiment, the first prism structure 220 and the second prism structure 240 of the optical film 20 have the same profile, and an included angle γ of the first axial direction B1 and the third axial direction B3 is from 30 degrees to 60 degrees. It should be noted that if the first prism structure 220 and the second prism structure 240 do not have the same profile, then asymmetric uniformity effects are obtained. Alternatively, if the included angle γ of the first axial direction B1 and the third axial direction B3 is not from 30 degrees to 60 degrees, then uniformity effects of light is only similar to the uniformity effects of light of the first prism structure 220 or is only the uniformity effects of light of the second prism structure 240.

In the present embodiment, the optical film 20, on the opposite surfaces of the same substrate, has island-shaped prism structures in two different axial directions and arranged in array, wherein an included angle between two different axial directions is from 45 degrees to 135 degrees. The optical film 20, on the opposite surfaces of the same substrate, has respectively island-shaped prism structure having the same profile in different axial directions and arranged in array, wherein an included angle between different axial directions is from 30 degrees to 60 degrees. Moreover, as a shortest distance between an acute angle and a bottom surface is greater, the acute angle formed between each of optical surfaces of each of prism structures and the bottom surface is smaller. As a shortest distance between an absolute value of slope and the bottom surface is greater, the absolute value of slope of each of the optical surfaces of prism structures is smaller. The optical film by the present embodiment allows lights to be distributed uniformly, and brightness thereof can be enhanced effectively.

Figure 5A:
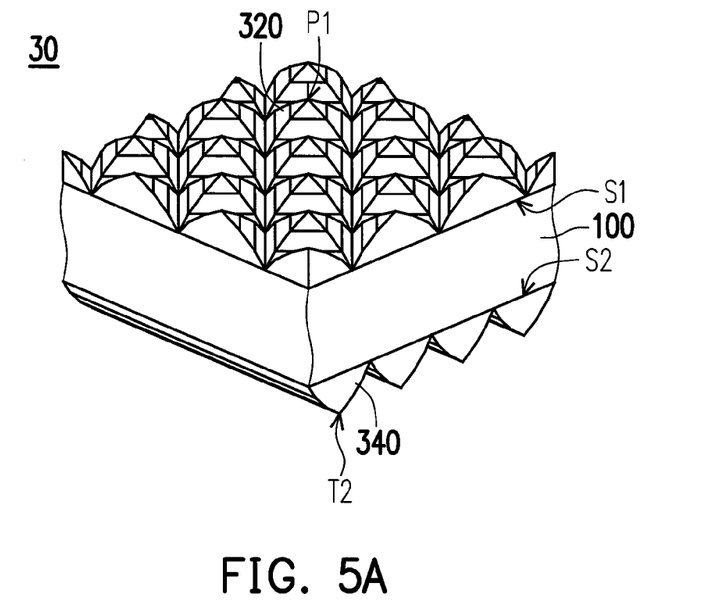
FIG. 5A is a schematic perspective view illustrating an optical film according to a third embodiment of the invention.
Figure 5B:
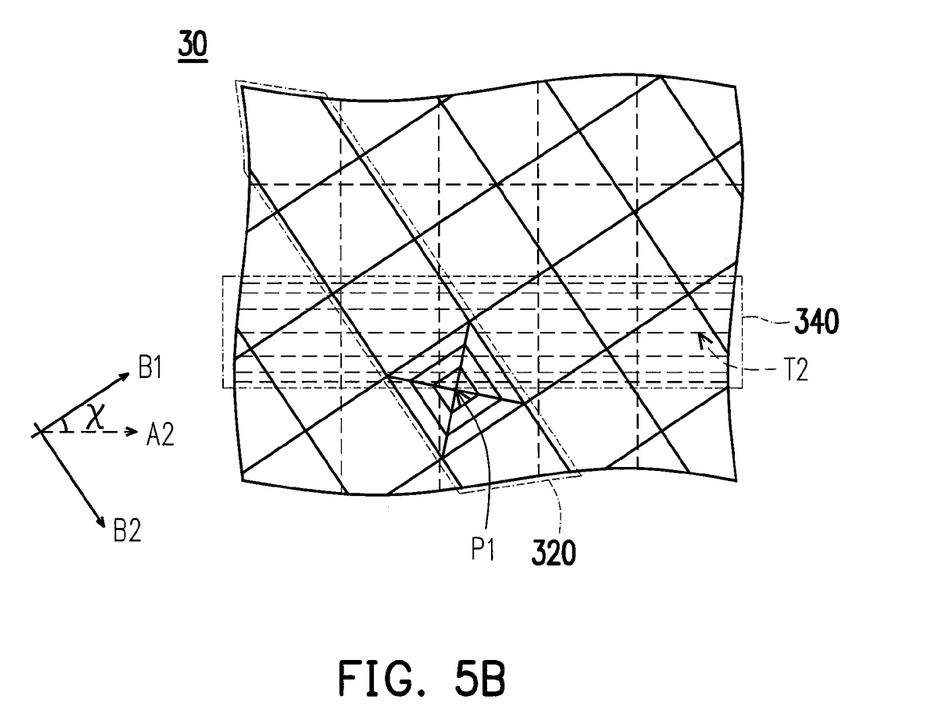
FIG. 5B is a top view illustrating the optical film of FIG. 5A.

FIG. 5A is a schematic perspective view illustrating an optical film according to a third embodiment of the invention. FIG. 5B is a top view illustrating the optical film of FIG. 5A (only one of periodical structures is illustrated for representation). Please refer to FIG. 5A and FIG. 5B together. In the present embodiment, an optical film 30 is similar to the optical films 10 and 20. Accordingly, the similar elements are indicated by the same reference numbers and have similar functions. Thus, descriptions thereof are omitted herein. A primary difference between the optical film 30 and the optical films 10 and 20 lies in that the first surface S1 of the substrate 100 of the optical film 30 is provided with a plurality of first prism structures 320, which may be, for example, the first island prisms of the optical film 20, and the second surface S2 of the substrate 100 of the optical film 30 is provided with a plurality of second prism structures 340, which may be, for example, the second strip prisms of the optical film 10.

On another aspect, the first surface S1 of the substrate 100 of the optical film 30 is provided with the first prism structures 320, which may be, for example, the first strip prisms of the optical film 10, and the second surface S2 of the substrate 100 of the optical film 30 is provided with the second prism structures 340, which may be, for example, the second island prisms of the optical film 20.

Examples are provided here by taking the first prism structure 320 as the first island prism of the optical film 20 and the second prism structure 340 as the second strip prism of the optical film 10. In addition to the above, in the present embodiment, the first axial direction B1 of the first island prism and the extending direction A2 of the second strip prism form an included angle χ. Preferably, the included angle χ of the first axial direction B1 of the first island prism and the extending direction A2 of the second strip prism is from 30 degrees to 60 degrees. It should be noted that since the first prism structure 320 and the second prism structure 340 do not have the same profile, asymmetric uniformity effects are obtained. Alternatively, if the included angle χ is not from 30 degrees to 60 degrees, then uniformity effects of light is only similar to the uniformity effects of light of the first prism structure 320, or is only the uniformity effects of light of the second prism structure 340.

In the present embodiment, the optical film 30, on one of the surfaces of the same substrate, has island-shaped prism structures in two different axial directions and arranged in array, wherein an included angle between two different axial directions is from 45 degrees to 135 degrees. In addition, the optical film 30, on the other opposite surface, has a plurality of strip prism structures parallel to each other, and an included angle χ of an extending direction of strip prisms parallel to each other and one of axial directions of island prism structure is from 30 degrees to 60 degrees. Moreover, as a shortest distance between an acute angle and a bottom surface is greater, the acute angle formed between each of optical surfaces of each of prism structures and the bottom surface is smaller. As a shortest distance between an absolute value of slope and the bottom surface is greater, the absolute value of slope of each of the optical surfaces of prism structures is smaller. The optical film by the present embodiment allows lights to be distributed uniformly, and brightness thereof can be enhanced effectively.

In light of the foregoing, the optical film of the invention, on the opposite surfaces of the same substrate, has respectively a plurality of strip-shaped prism structures parallel to each other. These strip-shaped prism structures have the same profile but extend toward different directions, wherein an included angle between different extending directions is from 60 degrees to 120 degrees. Alternatively, furthermore, the optical film, on the same surface of the same substrate, has island-shaped prism structures in two different axial directions and arranged in array, wherein an included angle between two different axial directions is from 45 degrees to 135 degrees. The optical film, on the opposite surfaces of the same substrate, has island prism structures having the same profile in different axial directions and arranged in array, wherein an included angle between two different axial directions is from 30 degrees to 60 degrees. Herein, as a shortest distance between an acute angle and a bottom surface is greater, the acute angle formed between each of optical surfaces of prism structures and the bottom surface is smaller. As a shortest distance between an absolute value of slope and the bottom surface is greater, the absolute value of slope of each of the optical surfaces of prism structures is smaller. The optical film by the present embodiment allows lights to be distributed uniformly, and brightness thereof can be enhanced effectively.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:
1. An optical film, comprising:
 a substrate, having a first surface and a second surface opposite to the first surface;
 a plurality of first prism structures arranged on the first surface, wherein each of the first prism structures has plurality sets of first optical surfaces, the first optical surfaces belonging to the same set have the same absolute value of slope, and the first optical surfaces belonging to different sets have different absolute values of slopes, respectively; and
 a plurality of second prism structures arranged on the second surface, wherein each of the second prism structures has plurality sets of second optical surfaces, the second optical surfaces belonging to the same set have the same absolute value of slope, and the second optical surfaces belonging to different sets have different absolute values of slopes, respectively.

2. The optical film as claimed in claim 1, wherein the first prism structures are a plurality of first strip prisms parallel to each other.

3. The optical film as claimed in claim 2, wherein each of the first prism structures respectively has a first bottom surface connected to the substrate, as a shortest distance between each of the first optical surfaces and the first bottom surface is greater, an acute angle formed between each of the first optical surfaces and the first bottom surface is smaller.

4. The optical film as claimed in claim 3, wherein, as the shortest distance between the each of the first optical surfaces and the first bottom surface is greater, an absolute value of slope of each set of the first optical surfaces is smaller.

5. The optical film as claimed in claim 2, wherein a top section of each of the first prism structures has a first crest line, and an extending direction of each of the first crest lines is parallel to an extending direction of the each of the first prism structures.

6. The optical film as claimed in claim 2, wherein the second prism structures are a plurality of second strip prisms parallel to each other.

7. The optical film as claimed in claim 6, wherein an extending direction of the first strip prisms and an extending direction of the second strip prisms form an included angle, and the included angle is from 60 degrees to 120 degrees.

8. The optical film as claimed in claim 6, wherein each of the second prism structures respectively has a second bottom surface connected to the substrate, as a shortest distance between each of the second optical surfaces and the second bottom surface is greater, an acute angle formed between each of the second optical surfaces and the first bottom surface is smaller.

9. The optical film as claimed in claim 8, wherein, as the shortest distance between the each of the second optical surfaces and the second bottom surface is greater, an absolute value of slope of each set of the second optical surfaces is smaller.

10. The optical film as claimed in claim 6, wherein a top section of each of the second prism structures has a second crest line, and an extending direction of each of the second crest lines is parallel to an extending direction of the each of the second prism structures.

11. The optical film as claimed in claim 1, wherein the first prism structures are a plurality of first island prisms arranged in an array along a first axial direction and a second axial direction.

12. The optical film as claimed in claim 11, wherein an included angle between the first axial direction and the second axial direction is from 45 degrees to 135 degrees.

13. The optical film as claimed in claim 11, wherein each of the first prism structures respectively has a first bottom surface connected to the substrate, as a shortest distance between each of the first optical surfaces and the first bottom surface is greater, an acute angle formed between each set of the first optical surfaces and the first bottom surface is smaller.

14. The optical film as claimed in claim 12, wherein, as a shortest distance between the each of the first optical surfaces and the first bottom surface is greater, an absolute value of slope of each set of the first optical surfaces is smaller.

15. The optical film as claimed in claim 11, wherein a top section of each of the first prism structures has a first vertex.

16. The optical film as claimed in claim 11, wherein the second prism structures are a plurality of second island prisms arranged in an array along a third axial direction and a fourth axial direction.

17. The optical film as claimed in claim 16, wherein an included angle between the third axial direction and the fourth axial direction is from 45 degrees to 135 degrees, and the first axial direction, the second axial direction, the third axial direction and the fourth axial direction do not overlap with each other.

18. The optical film as claimed in claim 16, wherein each of the second prism structures respectively has a second bottom surface connected to the substrate, as a shortest distance between each of the second optical surfaces and the second bottom surface is greater, an acute angle formed between each set of the second optical surfaces and the second bottom surface is smaller.

19. The optical film as claimed in claim 18, wherein, as the shortest distance between the each of the second optical surfaces and the second bottom surface is greater, an absolute value of slope of each set of the second optical surfaces is smaller.

20. The optical film as claimed in claim 16, wherein a top section of each of the second prism structures has a second vertex.

* * * * *